(12) United States Patent
Sung et al.

(10) Patent No.: US 12,554,475 B2
(45) Date of Patent: Feb. 17, 2026

(54) SECURED INSTANT INSTALLATION OF APPLICATIONS

(71) Applicant: Digital Turbine, Inc., Austin, TX (US)

(72) Inventors: Kai-Min Sung, Foster City, CA (US); Nir Peer, Ramat Gan (IL)

(73) Assignee: Digital Turbine, Inc., Austin, TX (US)

( * ) Notice: Subject to any disclaimer, the term of this patent is extended or adjusted under 35 U.S.C. 154(b) by 400 days.

(21) Appl. No.: 18/084,683

(22) Filed: Dec. 20, 2022

(65) Prior Publication Data

US 2024/0201970 A1 Jun. 20, 2024

(51) Int. Cl.
*G06F 8/61* (2018.01)
*H04L 9/30* (2006.01)
*H04L 9/32* (2006.01)

(52) U.S. Cl.
CPC .............. *G06F 8/61* (2013.01); *H04L 9/30* (2013.01); *H04L 9/3247* (2013.01)

(58) Field of Classification Search
CPC ......... G06F 8/61; G06F 8/60–66; H04L 9/30; H04L 9/3247; H04L 63/0435; H04L 63/0442
USPC ................................................ 717/168–178
See application file for complete search history.

(56) References Cited

U.S. PATENT DOCUMENTS

| | | | | |
|---|---|---|---|---|
| 9,940,444 B1* | 4/2018 | Murphy | ................ | H04L 9/3226 |
| 2005/0076222 A1* | 4/2005 | Olkin | ................ | H04L 63/0442 |
| | | | | 713/176 |
| 2012/0131349 A1* | 5/2012 | Layson | ................ | G06F 21/121 |
| | | | | 713/182 |
| 2014/0040879 A1* | 2/2014 | Goldman | ................ | G06F 8/61 |
| | | | | 717/175 |
| 2014/0331049 A1* | 11/2014 | Duby | ................ | H04L 9/3247 |
| | | | | 713/171 |
| 2019/0258466 A1* | 8/2019 | Mitchell | ................ | H04L 67/34 |
| 2019/0265958 A1* | 8/2019 | Ayers | ................ | G06F 21/57 |

OTHER PUBLICATIONS

Lortz, Steffen, et al., Cassandra: Towards a Certifying App Store for Android, Proceedings of the 4th ACM Workshop on Security and Privacy in Smartphones & Mobile Devices, Nov. 2014, 12 pages, [retrieved on Oct. 1, 2025], Retrieved from the Internet: <URL:http://dl.acm.org/>.*

Zhauniarovich, Yuri, et al., DEMO: Enabling Trusted Stores for Android, Proceedings of the 2013 ACM SIGSAC conference on Computer & communications security, Nov. 2013, 3 pages, [retrieved on Oct. 1, 2025], Retrieved from the Internet: <URL:http://dl.acm.org/>.*

* cited by examiner

*Primary Examiner* — Geoffrey R St Leger

(57) ABSTRACT

A system for securing application installation on a user device includes a secure link server and a verification server. The secure link server outputs a secured link for downloading an application onto a user device. The secured link includes a signature encrypted with a first key. Content with a single tap link is displayed on a user device. When the single tap link is selected, the user device requests authorization to automatically install the application in single tap mode. The verification server verifies the validity of a request signature included in the request. If the request signature is valid, automatic installation is authorized. If the request signature is invalid, automatic installation is prohibited and the device enters a different mode for downloading and installing the application.

26 Claims, 9 Drawing Sheets

SECURED INSTANT INSTALLATION OF APPLICATIONS

BACKGROUND

The present invention, in some embodiments thereof, relates to automatic installation of software applications on devices and, more specifically, but not exclusively, to securing automatic installation and updates of applications on devices.

The use of apps on mobile devices such as cell phones is very widespread. Users frequently install new apps on their devices, providing the devices with new functionality such as access to new services, online shopping, gaming and more.

Many advertisement campaigns encourage users to buy and install apps on their devices. Typically, when a user viewing the ad is interested in installing a new app, the user clicks on a link. After the link is clicked, the device connects to an app store from which the new app may be downloaded. The user may obtain more information about the app by interacting with the app store. If at the end of this interaction the user is still interested in installing the app, the app is downloaded from the app store by clicking on another link.

A significant problem with this flow is poor ad conversion. The conversion problem arises when a user who indicated interest in installing the new app is redirected to an app store. This redirection interrupts user interaction with the current app and forces user attention to the app store, which may not be desired by the user. This often results in the user deciding not to install the new app or even to install a competing app advertised by the app store.

One solution to this problem is to enable the device to install the application automatically with a minimum of user interaction and without directing the device to an app store. However the desire to limit user interaction as much as possible during app installation prevents the use of authentication schemes which require user interaction, such as sending the user a security code to enter prior to app installation. Downloading an application from a source that is not an authenticated app store leaves the device particularly vulnerable to attacks in which the device is misdirected to download and install an app which the user does not intend to install.

SUMMARY

It is an object of the present disclosure to describe a system, a server and a method for securing automatic installation of applications (i.e. apps) onto a user device.

Embodiments of the invention provide a technical solution to the problem of securing automatic download of applications onto a user device. In single tap mode, software applications are downloaded onto user devices automatically, typically after the user takes a single action on a link embedded in displayed content (e.g. by a single tap, double tap, selection from a dropbox, etc.). By operating in the background, single tap installation maintains the user experience and does not interrupt user interaction with the current application or content.

When single tap mode is not used, selecting a link redirects the device to an app store. The user is aware that a new application will be downloaded and is able to prevent download of an undesired application. However, unsecured single tap download is vulnerable to error or attack. If the user selected the single tap link inadvertently, an undesired application is automatically installed and the user must delete it from the device. In a more problematic scenario, the link has been tampered with so that when the user selects the link malware is automatically downloaded and installed.

It is important to prevent installation of undesired applications and malware on the user device as the result of a single user action. However standard security measures require significant user interaction and are unsuitable for the single tap operation.

The technical solution to this problem presented herein is to include an encrypted signature string in the single tap link, thereby creating a secured link. When the user selects the secured link, the device sends a request for approval of single tap mode to a verification server. The request includes a request signature that was included in the link selected by the user. If the link is secure, the request signature and encrypted signature string match. If the request signature and encrypted signature string do not match, the link has been tampered with or otherwise corrupted and is considered non-secure.

A verification server checks the validity of the request signature, optionally using parameter values included in the request as described in more detail below. If the request signature is valid, the verification server approves single tap mode. If the link is invalid, single tap mode is not approved and the device must shift to a different mode of responding to the user input. This solution is an improvement of the state current art, in which the device has no way of detecting that a single tap link is not secure.

The solution presented herein provides the benefits of addressing a replay attack. A replay attack occurs when an attacker eavesdrops on a secure network communication, intercepts a link and then fraudulently resends it to misdirect the receiver into installing the target app.

In the embodiments described herein, the encrypted signature string ensures integrity of the signature contents and proves that it was generated by a trusted source with the correct encryption key. Optionally, a nonce and expiration timestamp contained in the encrypted signature string limit a replay attack to an expiration window (typically set to under 30 mins, but dependent on the caching capabilities of Ad SDKs).

The foregoing and other objects are achieved by the features of the independent claims. Further implementation forms are apparent from the dependent claims, the description and the figures.

According to a first aspect of some embodiments of the present invention there is provided a verification server for securing application installation on a user device. The verification server includes processing circuitry configured to:
  input, from a user device, a request for automatic installation of the application onto the user device, the request including a request signature;
  verify a validity of the request signature using a first key associated with a second key used to generate valid signatures;
  when the request signature is valid, respond to the user device that the automatic installation is authorized; and
  when the request signature is invalid, respond to the user device that the automatic installation is prohibited.

According to a second aspect of some embodiments of the present invention there is provided a method for securing application installation on a user device. The method includes: inputting, from the user device, a request for automatic installation of the application onto the user device, the request comprising a request signature;

verifying a validity of the request signature using a first key associated with a second key used to generate valid signatures;

when the request signature is valid, responding to the user device that the automatic installation is authorized; and when the request signature is invalid, responding to the user device that the automatic installation is prohibited.

According to some embodiments of the invention, the first key and the second key are identical.

According to some embodiments of the invention, the first key is a public key and the second key is the private key corresponding to the public first key.

According to some embodiments of the invention, the request comprises respective values of at least one parameter used to create a valid signature.

According to some embodiments of the invention, the request further includes respective values of at least one parameter used to create a valid signature, and the validity of the request signature is verified by:

forming a first string from the parameter values according to rules used to generate a signature string for a valid secured link;

decrypting the request signature using the first key; and comparing the first string to the decrypted request signature, the request signature being valid when the first string and the decrypted request signature are the same and invalid when the first string and the decrypted request signature are different.

According to some embodiments of the invention, forming the first string includes performing a hashing operation on a preliminary string formed from the parameter values, using a same hashing algorithm used to generate valid signatures.

According to some embodiments of the invention, at least one of the parameters used to create a valid signature comprises:

a device identifier;
a signature version identifier;
an application identifier;
a cryptographic nonce; and
an expiration timestamp.

According to some embodiments of the invention, automatic installation is prohibited when an expiration timestamp for the request has expired.

According to some embodiments of the invention, automatic installation is prohibited when a request for automatic installation received from the user device is missing a request signature.

According to a third aspect of some embodiments of the present invention there is provided a system for securing application installation on a user device. The system includes a secure link server and a verification server. The secure link server is configured to output a secured link for automatically downloading and installing an application onto a user device, wherein the secured link includes a signature string encrypted with a first key. The verification server is configured to:

input, from the user device, a request for automatic installation of the application onto the user device, the request including a request signature;

verify a validity of the request signature using a second key associated with the first key; when the request signature is valid, respond to the user device that the automatic installation is authorized; and when the request signature is invalid, respond to the user device that the automatic installation is prohibited.

According to some embodiments of the invention, the system includes a first secure vault for providing the first key to the secure link server and a second secure vault for providing the second key to the verification server.

According to some embodiments of the invention, the first key and the second key are identical.

According to some embodiments of the invention, the first key is a private key and the second key is the public key corresponding to the private first key.

According to some embodiments of the invention, the secure link server is configured to generate the secured link by:

forming a first string from at least one parameter value in accordance with specified rules;

encrypting the first string with the first key; and creating a secured link comprising the encrypted first string and the at least one parameter value.

According to some embodiments of the invention, the secure link server is configured to generate the secured link by:

forming a first string from at least one parameter value in accordance with specified rules;

signing the first string with the first key; and creating a secured link comprising the encrypted first string and the at least one parameter value.

According to some embodiments of the invention, the secure link server outputs the secured link to one of:

a content server for forwarding the secured link to be rendered in content displayed on the user device; and the user device.

According to some embodiments of the invention, the request further includes respective values of at least one parameter used by the secure link server to create a valid signature string in accordance with specified rules, and the verification server is configured to verify the validity of the request signature by:

forming, using the specified rules, a second string from respective values of the parameters extracted from the request;

decrypting the request signature using the second key; and comparing the second string to the decrypted request signature, the request signature being valid when the second string and the decrypted request signature are the same and invalid when the second string and the decrypted request signature are different.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Figure 1:
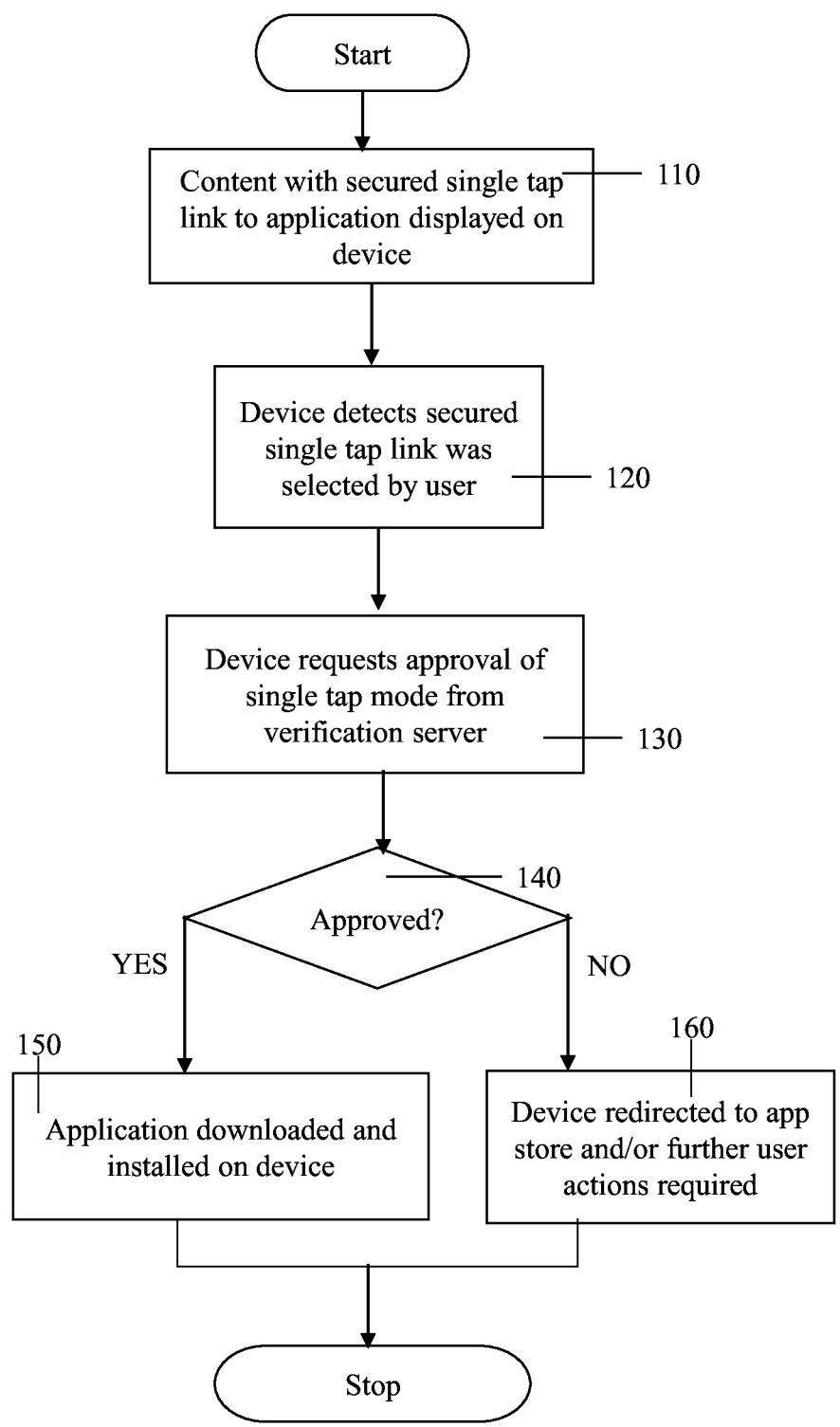
FIG. 1 is a simplified flowchart of an exemplary method for single tap operation on a user device.

The present invention, in some embodiments thereof, relates to automatic installation of software applications on devices and, more specifically, but not exclusively, to securing automatic installation and updates of applications on devices.

User experience (UX) is typically based on the user's interaction with the user interface input and output elements (e.g. touchpad, keyboard, display, etc.). Single tap installation maintains the UX of interacting with the current software application or content. By maintaining the UX in the current app, the user is not distracted by being forced into interaction with a different app or web page (such as an app store). The user is therefore more likely to continue with application installation process.

The embodiments presented herein provide security for automatic installation of applications on user devices (denoted herein single tap mode or single tap operation). Embodiments of the invention described herein include an encrypted signature string in the single tap link presented on the user device (denoted herein a secured single tap link or a secured link). As described in more detail below, the encrypted signature string is created using a first encryption key (denoted the signature generation key). The link's format and/or metadata enables the device to determine that approval must be received from an external server prior to automatically downloading the installation file for the selected application.

When the user selects a single tap link in content displayed on the device, the user device requests authorization from a verification server to proceed with single tap installation of the application identified in the link. The request signature included in the single tap link is provided with the request, for example by including the entire single tap link. Verifying the validity of the request signature link is performed by a separate element (e.g. server), not by the user device itself. The user device may perform additional authentication procedures.

The validity of the request signature is verified using a second encryption key (denoted herein the verification key). Single tap operation is permitted when the request signature is valid and is not permitted when the request signature is invalid. If the request signature is valid, single tap operation is permitted and the device is authorized to automatically download and install the application identified in the link. If the signature is not valid, single tap operation is prohibited and the device reverts to a non-single tap operation mode, for example by requiring an additional action by the user before continuing with download and installation.

When asymmetric encryption is used, the encryption keys are a private key/public key pair. The signature generation key is the private key and the verification key is the public key.

When symmetric encryption is used the first encryption key and the second encryption key are identical. The signature generation key and the verification key are the same key.

In some embodiments, a secure link server and a verification server perform independent operations which together ensure that the single tap link displayed on the device has not been tampered with by a third party. The secure link server and the verification server do not communicate with each other. This is possible because they hold corresponding encryption keys, and because they may utilize the same set of rules to generate strings from a set of parameter values as described in more detail below.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that when the present disclosure describes one or more entities or at least one entity performing more than one action, any of the entities may perform any combination of actions of the more than one action, such that any of a group of actions consisting of the more than one action is performed by any of the one or more entities or all the entities of the one or more entities.

Single Tap Flow on the User Device

Reference is now made to FIG. 1, which is a simplified flowchart of an exemplary method for single tap operation on a user device. FIG. 1 is presented for clarity in order to illustrate an example of device-side operation during single tap operation and is non-limiting with regard to embodiments of the invention described herein. For purposes of explanation, in some embodiments the single tap link is described as a link in content (e.g. a web page) displayed on the device. However it is to be understood that the embodiments described herein may be adapted by the skilled professional for any content provided with a secured single tap link (e.g. a link embedded in the current app).

FIG. 1 shows a non-limiting embodiment in which a new application is installed on the user device. In other embodiments, a similar flow is followed to download and install an update to an app already installed on the user device.

In 110, the device displays content which includes a single tap link. The single tap link includes an identifier of the app to be installed (or updated) on the device and a request signature. Optionally, the link includes additional information (e.g. parameter values) which may be extracted from the secured link without an encryption key.

In 120 the device detects that the secured link was selected by the user, and that the app identified in the link should be installed automatically in single tap mode, without redirecting the user to an app store. Optionally, the device detects that the link is a single tap link from the link's format and/or metadata.

In response to the user action, in 130 the device communicates with a verification server and requests approval for automatic installation of the application. In one example the location of the application installation file is specified in a response returned by the verification server. The request includes the request signature.

If single tap installation is approved in 140, in 150 the application is downloaded and installed on the device with minimal or no interaction with the user. The user device may download the application installation file from the trusted source specified in the secured link.

If not approved, in 160 the device switches to a different mode for installing the application. In one example, the device requests additional confirmation from the user, for example in a pop-up window or banner on the display. In a second example, the device is redirected to an app store. Typically, the user device continues to display the app store page that describes the app until the user actively exits the app store.

In one example, single tap operation is implemented on the device by a dedicated installation client. The installation client is invoked to run in the background when the user selects the single tap link to download the new app. The current app is not exited when the installation client is invoked. The user may continue to use the current app without being aware that installation client is now active in the background.

When the installation client detects that a single tap link has been selected, it forwards the link, including the request signature, to the verification server. If the verification server responds that the link is valid, the installation client automatically downloads an installation file for the new app (e.g. an APK file) and installs the new app on the device. If permission is not received, the installation client switches to a different application download mode.

Optionally, installation client 140 obtains address information to the installation file by looking up the address using information present in the link (for example from parameters such as an ad campaign identifier).

In an exemplary embodiment, the installation client is registered for a dedicated link format which is not used by other types of applications/clients. When a single tap link having the registered format is selected, the only application on the mobile device able to handle the single tap link is the installation client. Thus the installation client is automatically invoked for every link having the registered format. For example, single tap links may be registered with the Android™ operating system as app links using Hypertext Transfer Protocol (HTTP) Uniform Resource Locators (URLs) containing a specific domain.

Embodiments of single tap operation by an installation client running on the device are described in U.S. Pat. No. 10,782,951, which is incorporated in its entirety by reference into the specification.

As used herein the term "single tap link" means a link which when selected causes the device to perform actions necessary to automatically download and install an app. These actions include obtaining approval for operating in single tap mode prior to automatically downloading the application installation file.

As used herein the terms "secured single tap link" and "secured link" mean a link which includes a valid encrypted signature string and indicates a specific app (or apps) that should be automatically installed by the device.

As used herein the term "user selects the secured link" and corresponding terms means the user takes an action that indicates that the application specified by the single tap link should be installed on the device. The manner in which the selection is made is based on the capabilities of the device and/or user interface and/or the current app. In one non-limiting example, the secured link is selected by clicking on a call-to-action button of an advertisement. In a second non-limiting example, the secured is selected by clicking on a link within an email.

As used herein, the terms "device" and "user device" mean a network-connected device on which software is installed and runs. The term "device" includes both mobile devices (such as mobile phone, tablet, laptop, etc.) and non-mobile devices (such as smart TVs, desktop computers, network enabled devices, etc.).

As used herein, the terms "software application", "application" and "app" mean a software program installed (or to be installed) on a device.

As used herein the term "installation file" means a file that after download to the device enables installation or update of the app on the device.

As used herein the term "automatically download" means that the installation file is downloaded and installed on the device without redirecting the device to an app store.

As used herein the term "app store" means a platform for receiving user instructions to install a software app and for making the installation file of the app accessible for download to the device. The app store is an external platform to which the user device is redirected by the current app. The term "app store" includes platforms for distributing applications to mobile devices (e.g. mobile phones, tablets, laptop computers etc.) and/or to non-mobile devices (e.g. desktop computers, smart TVs, etc.). Examples of app stores for mobile devices include but are not limited to Google Play® Store and Apple® App Store.

As used herein, the term "redirected to an app store" means that user interaction with the device is shifted to a site and/or application for obtaining apps. Examples of redirection to an app store include, opening an app store home page in a browser, opening a specific app store web page for the new app in a browser and activating a dedicated app store application on the device.

Secured Single Tap System Configuration

Figure 2A:
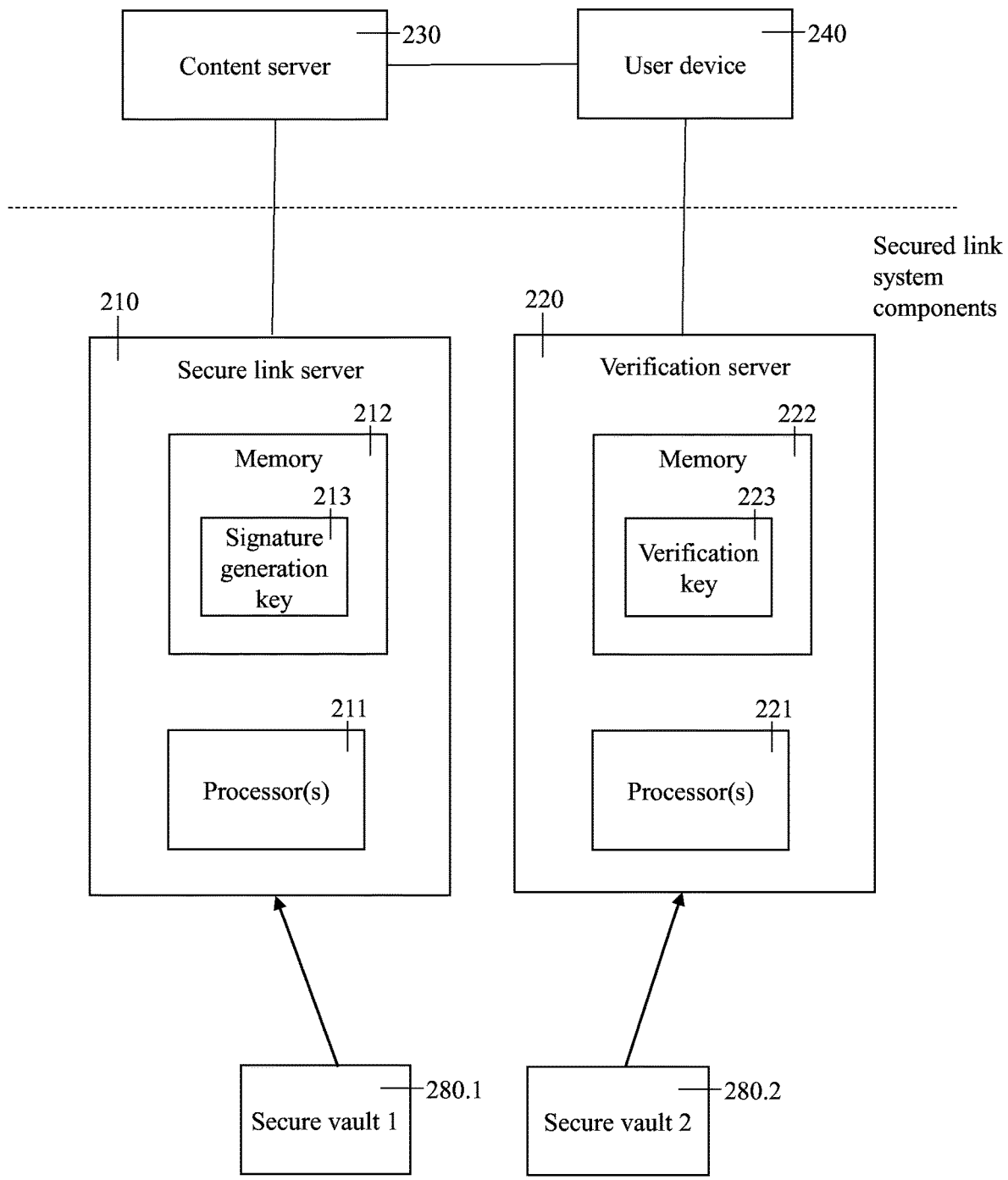
FIG. 2A is a simplified schematic diagram of a system for securing automatic application installation on a device, according to some embodiments of the invention.
Figure 2B:
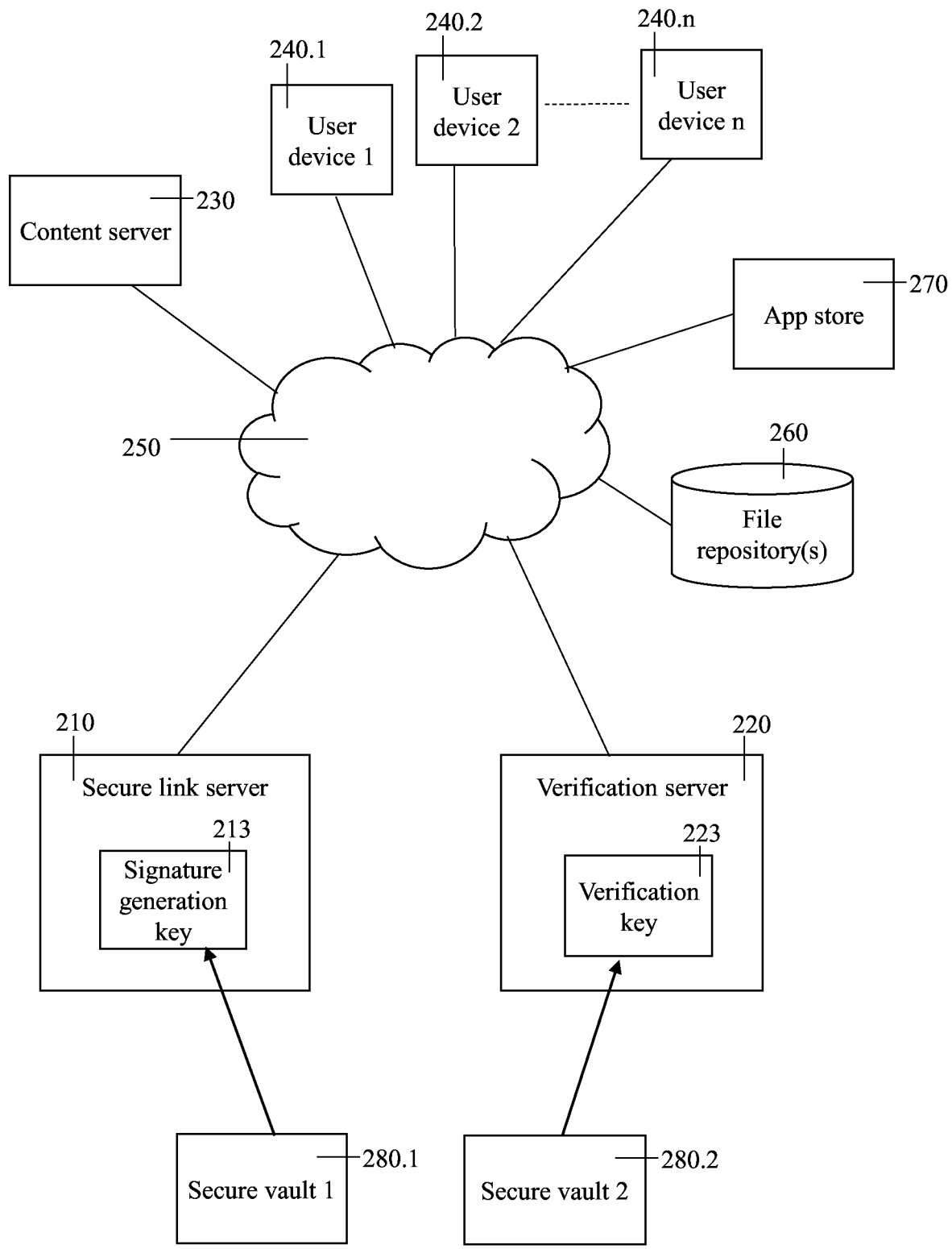
FIG. 2B is a simplified network diagram for secured single tap application installation, according to some embodiments of the invention.

Reference is now made to FIGS. 2A-2B, which are simplified schematic diagrams of a system for securing automatic application installation on a device, according to respective exemplary embodiments of the invention. FIG. 2A illustrates as simplified example with direct interaction between the elements participating in secured single tap operation. FIG. 2B illustrates a similar interaction, where communication between the elements is via a communication network.

The system includes secure link server 210 and verification server 220, and optionally secure vaults 280.1-280.2. Secure link server 210 and verification server 220 communicate with content server 230 and user device 240 respectively.

As will be apparent to the skilled person, secure link server 210 and verification server 220, and optionally secure vaults 280.1-280.2, include respective communication interface(s) as required for network communication and/or direct communication with each other and/or other components such as content server 230 and user device 240.

Secure link server 210 may be deployed on one or more machines, including but not limited to hardware server(s) and/or web server(s) and/or virtual machine(s) and/or container environment(s) running on hardware machine(s). Each of the machines includes one or more processor(s) 211. Optionally, the secure link server includes memory 212 storing signature generation key 213.

Verification link server 220 may be deployed on one or more machines, including but not limited to hardware server(s) and/or web server(s) and/or virtual machine(s) and/or container environment(s) running on hardware machine(s). Each of the machines includes one or more processors 221. Optionally, the verification server includes memory 222 storing verification key 223.

For clarity FIG. 2A shows a non-limiting example with a single user device 240 that is enabled for automatic application installation (also denoted herein single tap operation). As will be readily understood, multiple user devices may connect in a similar manner to the verification server 220 and request link verification.

Secure link server 210 outputs secured single tap links for downloading an application onto a user device 240. In order to generate a secured link, secured link server 210 forms a string (denoted herein a signature string) from one or more parameter values. An encrypted signature string is generated by encrypting the signature string using a first key (denoted herein the signature generation key). The secured link identifies the application to be downloaded.

The secured link includes the encrypted signature string and the parameter values used by secure link server 210 to generate the secured signature string. The secured link is formatted in a way that enables user device 240 and/or verification server 220 to extract a signature and parameter values from the secured link. In one example, the secured link includes a campaign ID identifying the application to be installed, the parameter values and the encrypted signature string.

The secured link may be formatted in any known scheme, for example as a standard HTTP link or using a custom URL scheme, with the addition of the secured signature string. In one example, the parameter values and the encrypted signature string are located in the link query string.

Exemplary embodiments of secure link generation by secure link server 210 are described in more detail below.

Optionally, there is no direct communication between secure link server 210 and verification server 220. Secure link server 210 and verification server 220 communicate independently with the elements participating in the secure single tap operation. Secure link server 210 communicates with content server 230 and verification server 220 communicates with user device 240.

As used herein the term "signature string" means a string generated from the respective values of one or more parameters according to a set of rules.

As used herein the term "encrypted signature string" means a signature string that has been encrypted with the signature generation key.

As used herein the term "content server" means a secure source of content for the user device. Examples of content servers include but are not limited to: an ad exchange, a website and an email server.

Optionally, the secured link is provided by secure link server 210 in response to a request received from content server 230. In one example, the content provider is an ad exchange, the request is a bid request for an ad and secure link server 210 returns an ad signed with the secured link. Content server 230 then provides content with the secured link to user device 240.

Optionally, the secured link is part of an advertisement or ad campaign. In some embodiments, content server 230 is an ad exchange and secure link server 210 includes bidder functionality. When ad space is available, content server 230 requests a secured single tap link from secure link server 230. Secure link server 210 selects an ad campaign for the link, generates the secure link for the selected ad campaign and returns the secured link to content server 230. Content server 230 then provides content with the secured link to user device 240. Alternately or additionally, secure link server 230 sends the secured link to another type of content provider such as a website (not shown) and the content provider sends the content with the secured link to the user device.

When the user selects a single tap link, user device 240 sends a request for verification of the selected link to verification server 220. The request for verification includes the request signature that was included in the selected link.

In one example, user device 240 forwards the entire secured link to verification server 220 and verification server 220 extracts the request signature from the link. Optionally, verification server 220 also extracts unencrypted parameter values from the link. In a second example, user device 240 extracts the request signature from the selected link and sends it to verification server 220 with any additional values needed by verification server 220 to check if the request signature is valid.

Verification server 220 determines whether the request signature is valid using the verification key. An invalid request signature indicates that the link may have been tampered with, corrupted or been replaced by a different, non-secured link.

If the request signature is valid, verification server 220 responds to user device 240 authorizing automatic installation (or updating) of the application by user device 240. If the request signature is not valid, verification server 220 responds to user device 240 prohibiting automatic installation (or updating) of the application. When automatic download is prohibited, device 240 may switch to a different download mode, such as redirecting to an app store.

Reference is now made to FIG. 2B, which is a simplified network diagram for secured single tap application installation, according to some embodiments of the invention. For clarity, a non-limiting example having a single network 250 connecting the elements involved in secure single tap operation. In alternate embodiments these elements are connected by multiple networks (e.g. Internet, local area network, etc.) and/or by direct communication between some elements.

Secure link server 210, verification server 220, user devices 240.1-240.n and content server 230 communicate by network communication over network 250. Optionally, there is no communication between secure link server 210 and verification server 220.

User devices may also communicate over the network with one or more file repository(s) 260 and with App store 270. When automatic installation of the application is approved by verification server 220, the user device may download the application's installation file (e.g. APK) from file repository(s) 260. When automatic installation is prohibited, the user device redirects to App store 270.

Encryption Keys

Secure link server 210 and verification server 220 operate independently. Independent verification of the request signature is possible because verification server 220 is able to decrypt valid encrypted signature strings using verification key 223. The verification server therefore does not need to communicate with secure link server 210 in order to verify that the request signature is valid.

Signature generation key 213 and verification key 223 may be obtained by secure link server 210 and verification server 220 by any means known in the art. FIG. 2A shows a first optional embodiment in which corresponding keys are obtained from secure vaults 280.1 and 280.2. Secure vault 280.1 provides a key to secure link server 210 and secure vault 280.2 provides a key to verification server 220 without forming a communication channel between secure link server 210 and verification server 220.

Secure vaults 280.1 and 280.2 may run on separate machines or on the same machine.

In a first exemplary embodiment, secure link server 210 generates a private/public key pair, stores the private key in secure key vault 280.1 and sends the public key to verification server 220.

In a second example, secure key vaults 280.1-280.2 send the signature generation and verification keys in response to respective queries from secure link server 210 and verification server 220.

Optionally, asymmetric encryption is used and signature generation key 213 and verification key 223 are a private key/public key pair. The encrypted signature string is generated by encrypting the signature string using the private key. The request signature is decrypted by verification server 220 using the public key.

In alternate embodiments, symmetric encryption is used and signature generation key 213 and verification key 223 are identical. The request signature is decrypted by verification server 220 using the same key that was used by secure link server 210 to encrypt the signature string for the secured link. Optionally, the key is shared through an out-of-band secure method, for example over Pretty Good Privacy (PGP) email.

Secure Link Server

The secure link server outputs secured links for automatic download of applications onto user device. The secured link includes an encrypted signature string that was encrypted using the signature generation key.

Figure 3:
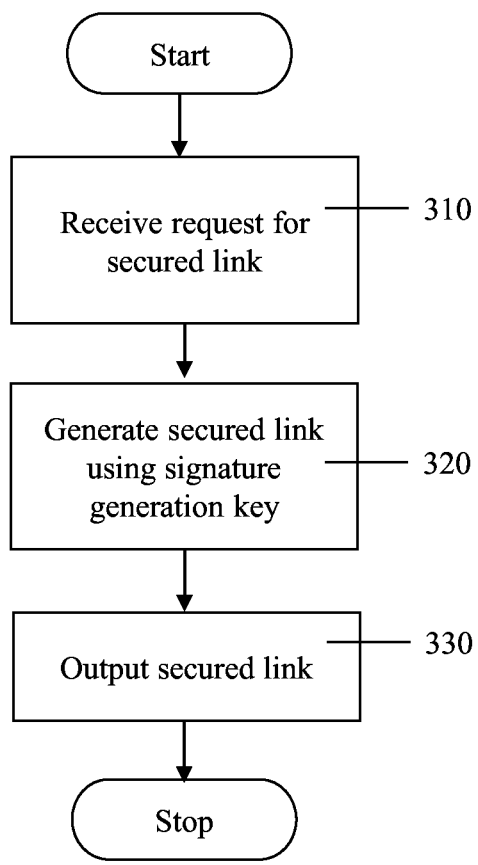
FIG. 3 is a simplified flowchart of a method for providing a secured link according to some embodiments of the invention.

Reference is now made to FIG. 3, which is a simplified flowchart of a method for providing a secured link according to some embodiments of the invention. In some embodiments the method is performed by a secure link server as described herein.

In 310, a request for a secured link is received.

In 320, the single tap link is generated using the signature generation key. The secured link includes an encrypted signature string.

In 330, the single tap link is output.

Optionally, the encrypted signature string is generated from a signature string formed from one or more parameter values according to specified rules.

Optionally, the encrypted signature string is generated by encrypting the signature string using the signature generation key. In alternate or additional optional embodiments, the encrypted signature string is generated by signing the signature string using the signature generation key. Signing the signature string and verifying a signed string may be performed by any means known in the art.

Figure 4:
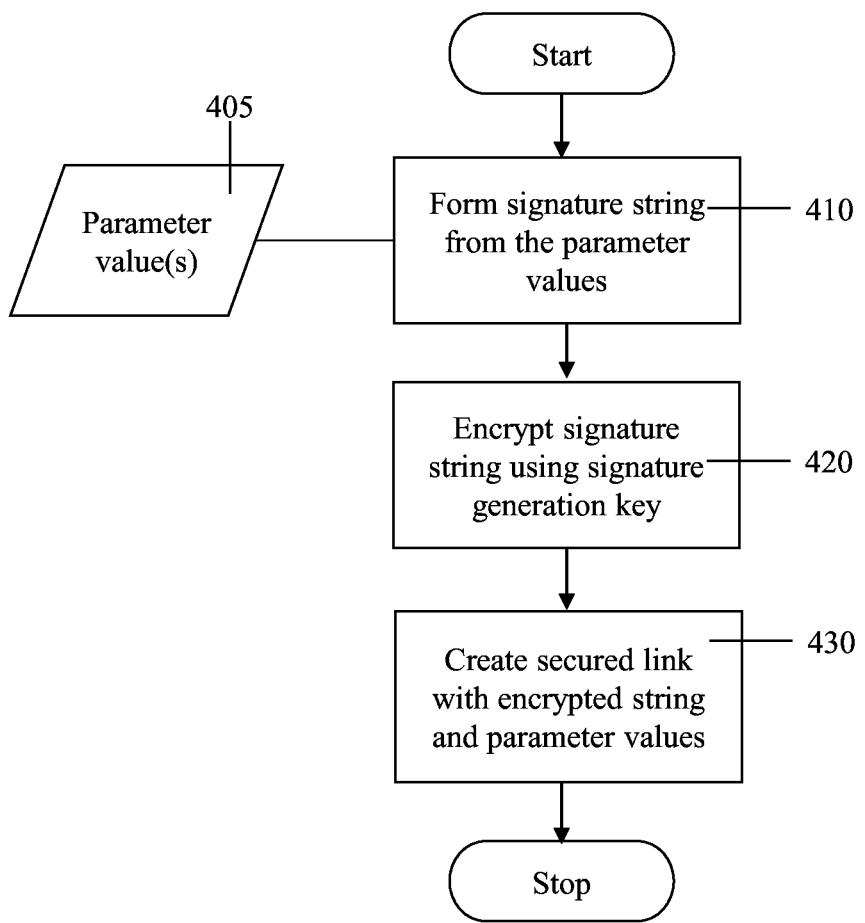
FIG. 4 is a simplified flowchart of a method for generating an encrypted signature string according to some embodiments of the invention.

Reference is now made to FIG. 4, which is a simplified flowchart of a method for generating an encrypted signature string according to some embodiments of the invention. In some embodiments the method is performed by a secure link server as described herein.

In 410, a signature string is formed from parameter value(s) 405 using a specified set of rules. The rules may include any operations that prepares the signature string to be encrypted into an encrypted signature string Examples of operations that may be performed on the parameter values include but are not limited to:

1) Forming a text string containing a parameter values in a predefined order, with optional spacing characters (e.g. combining the parameter values into a UTF-8 string);
2) Encoding;
3) Format translation (e.g. text to binary); and
4) Hashing.

In 420 the signature string is signed or encrypted with the signature generation key. As known in the art, the signature string is considered to be "signed" when the private key of an asymmetric key pair is used and is considered to be "encrypted" when a symmetric key is used. In 430, a secured single tap link is created from the encrypted signature string and parameter value(s) 405.

Parameters which may be used to generate the signature string include but are not limited to:

1) A device identifier (for example an Apple Identifier for Advertisers or an Android Advertising ID)—Associates the single tap link with a specific user device. May be used by the verification server to detect whether the request for single tap operation came from the correct device;
2) An application identifier (for example an iOS bundle ID)—Identifies the application the single tap link is intended to install;
3) A signature version identifier—Enables the verification server to validate the single tap link even when there are multiple sets of rules used by the single tap link server to create a single tap link;
4) A cryptographic nonce—Adds a random or pseudo-random element into the signature string, increasing the difficulty for an attacker to create a verifiable link; and
5) An expiration timestamp—Limits the time the single tap link is valid.

In one example, the single tap link server outputs the secured link to a content server. The content server sends content with the single tap link to the user device.

In a second example, the single tap link server forwards the secured link directly to the user device. The single tap link may be placed in displayed content by the user device or in content provided to the user device by a third party content provider.

In a third example, the secure link server provides the content (e.g. code instructions for rendering the content on the user device) in addition to the secured link.

Verification Server

Figure 5:
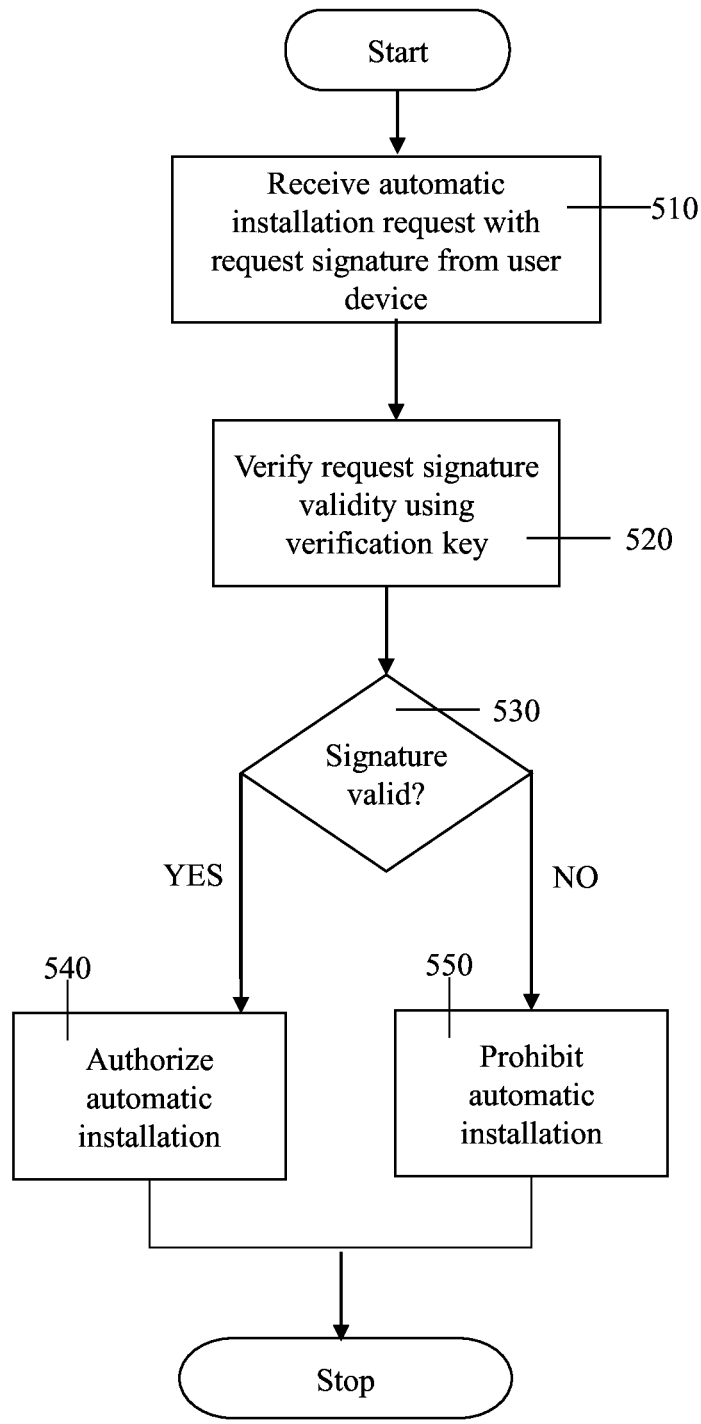
FIG. 5 is a simplified flowchart of a method for responding to a request for authorization of automatic installation of applications, in accordance with some embodiments of the invention.

Reference is now made to FIG. 5, which is a simplified flowchart of a method for responding to a request for authorization of automatic installation of applications, in accordance with some embodiments of the invention. In some embodiments the method is performed by a verification server as described herein. FIG. 5 shows a non-limiting embodiment for automatic installation of a new application on the user device. In other embodiments, a similar flow is followed to authorize automatic updating of an app already installed on the user device.

In 510, a request for automatic installation of an application is received from a user device. The request includes a request signature and values for the parameters used to generate valid secured signatures (denoted herein request parameter values). When the secured link is invalid, at least one request parameter value is not equal to the parameter value that was used to create the valid signature string and/or the expiration timestamp is in the past (i.e. the link has expired).

Optionally, the request includes an entire single tap link and the request signature and request parameter values are extracted from the single tap link.

In 520-530, the validity of the request signature is verified using the verification key. If the request signature is valid, in 540 the user device is authorized to perform automatic installation of the application. If the request signature is invalid, in 550 the user device is prohibited from performing automatic installation of the application.

Optionally, automatic installation is prohibited if the request for automatic installation is missing a request signature.

Optionally, automatic installation is prohibited if the request is missing one or more parameter values.

Optionally, one of the parameters is an expiration timestamp, and automatic installation is prohibited if the expiration timestamp has expired.

Figure 6:
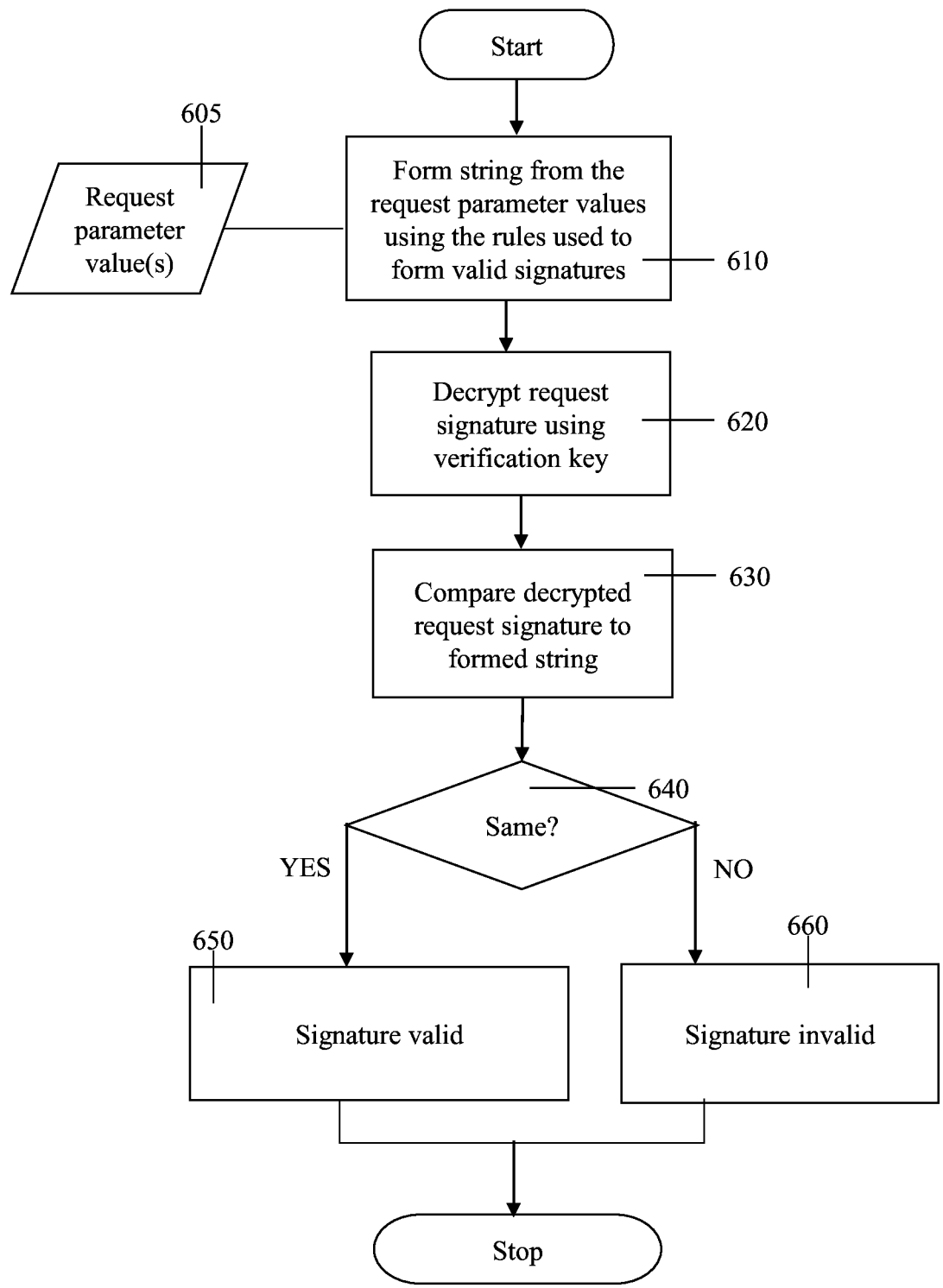
FIG. 6 is a simplified flowchart of a method for verifying a request signature, according to some embodiments of the invention.

Reference is now made to FIG. 6, which is a simplified flowchart of a method for verifying a request signature, according to some embodiments of the invention. In some embodiments the method is performed by a verification server as described herein.

The request from the user device includes a request signature and values 605 for the parameter(s) used to generate a valid signature string.

In 610 a request signature string is generated from the request parameter values provided with the request. The request signature string is generated using the same rules used to form a valid signature string (e.g. in the same order, using the same hashing algorithm, encoding, encryption/decryption algorithm etc.).

In 620 the request signature is decrypted using the verification key. If parameter values 605 are all equal to the values used to form the signature string (i.e. before encryption), the request signature string formed in 610 will be the same as the decrypted request signature.

In 630-640 the request signature string is compared to the decrypted request signature. If they are the same, in 650 the signature is valid. If they are different, in 660 the signature is invalid.

Exemplary System for Securing Single tap Application Installation

Figure 7:
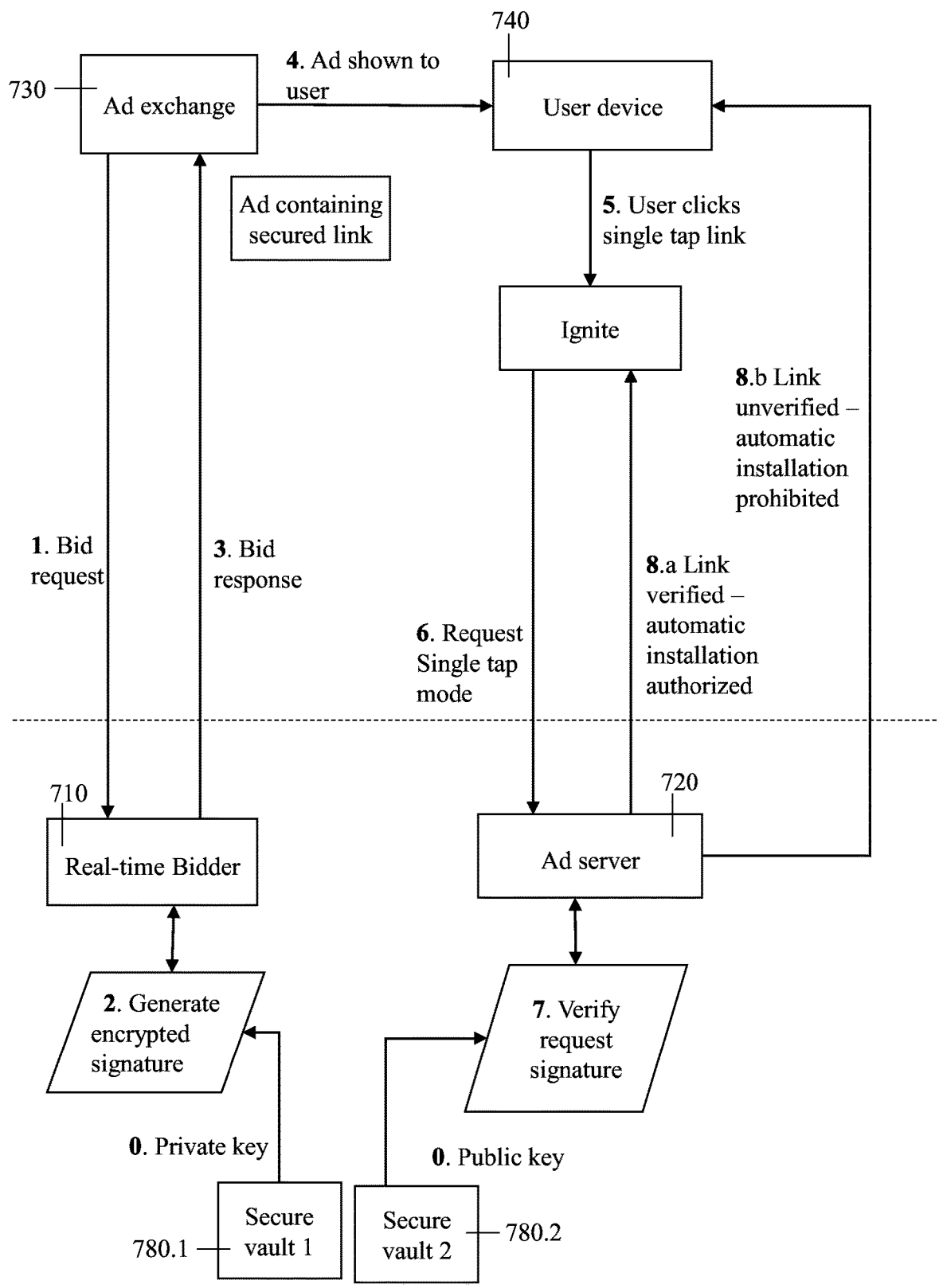
FIG. 7 is a simplified flow diagram of securing automatic application installation, according to an exemplary embodiment of the invention.

Reference is now made to FIG. 7 which is a simplified flow diagram of securing automatic application installation, according to an exemplary embodiment of the invention. Real-time bidder (RTB) 710 is an exemplary embodiment of a secure link server. Ad server 720 is an exemplary embodiment of a verification server. This exemplary embodiment uses a private/public key pair. An installation client on the user device (denoted Ignite) performs the device-side operations.

Flow Walkthrough

0. Real-Time Bidder 710 generates a private/public key pair offline and stores the private key in secure vault 1 780.1. Real-Time Bidder 710 shares the public key with Ad Server 720, which stores it in secure vault 2 780.2. At load-time Real-Time Bidder 710 and Ad Server 720 load the private and public keys respectively from secure vaults 780.1 and 780.2 into process memory.
1. Real-Time Bidder 710 receives a bid request from a trusted Ad Exchange 730 over a Secure Sockets Layer (SSL) connection.
2. Real-Time Bidder 710 determines an ad to serve for the bid, it generates a Single Tap link and an associated signature string which contains the Single Tap siteId, campaignId, a random nonce, and an expiration timestamp in the future. The signature is signed using the private key. The expiration window is configurable by Ad exchange 730, and is typically set to under 30 minutes.
3. Real-time bidder 710 returns a bid response to Ad exchange 730 over the SSL connection. The bid response contains the ad tag and the signed Single Tap link.
4. Ad exchange 730 renders the Single Tap ad to user device 740 through the Exchange's Ad SDK. The communication between the Exchange and the Ad SDK is over an SSL connection.
5. The user clicks on the Single Tap link displayed on user device 740. This invokes an Android intent and passes control to the Ignite software on-device. If Ignite is not on device, the user is redirected to the Google Play® Store or Apple® App Store to complete the install.
6. Ignite makes a request to Ad Server 720 over an SSL connection to receive information regarding the Single Tap campaign and modal.
7. The Ad Server 720 verifies the validity of the Single Tap signature using the Single Tap public key. It also validates that the siteId and campaignId parameters match the signature and that the expiration timestamp is in the future.
8. a. If the Single Tap signature is verified, device 740 is authorized proceed with the 1-tap Single Tap modal is returned to device 740 to initiate an Instant Install.
   b. If the Single Tap signature fails verification, a 2-tap Single Tap modal is returned which requires the user to click on the Install call to action (CTA) in order to install the application.

Messaging

Figure 8:
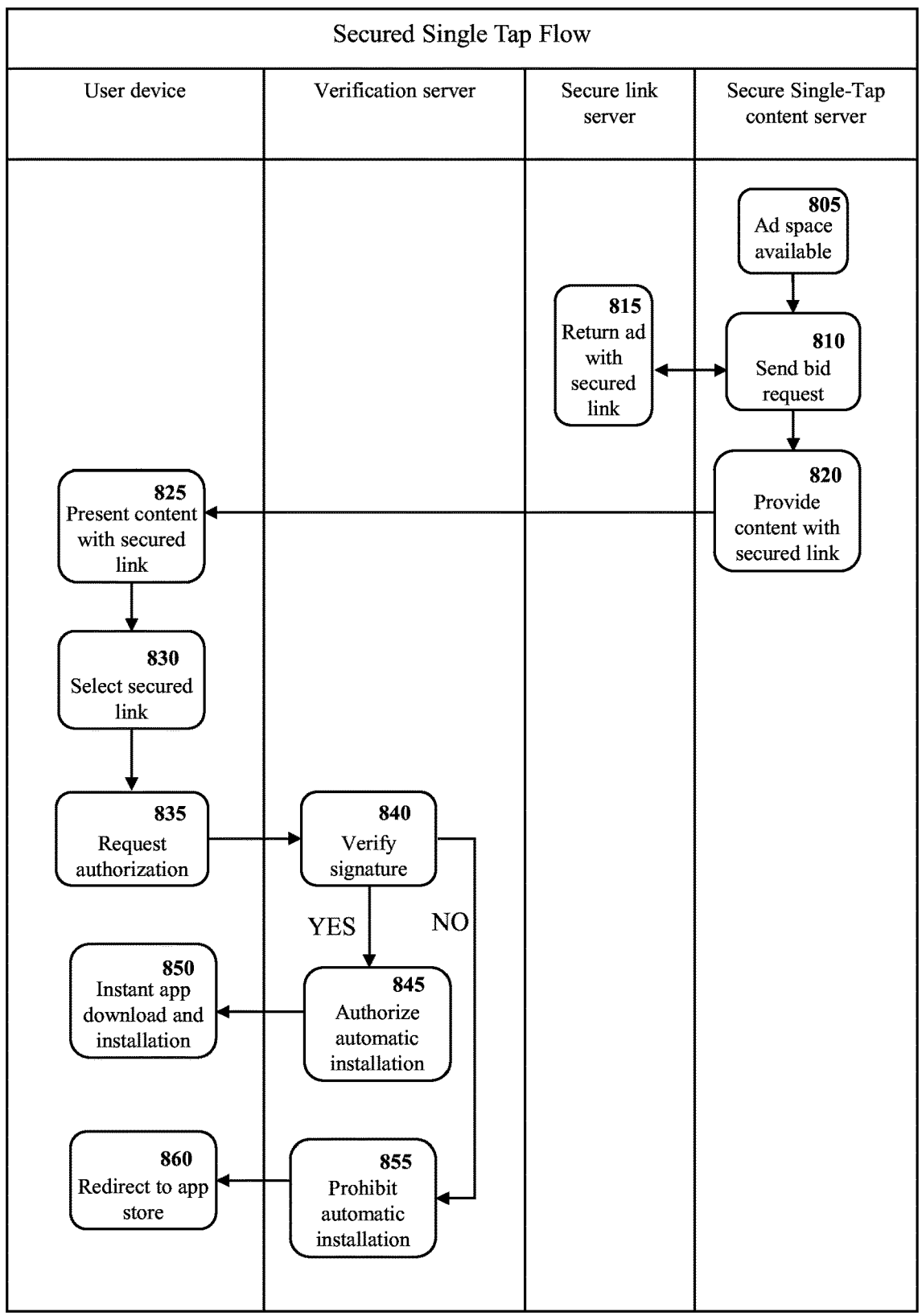
FIG. 8 is a simplified messaging flow diagram according to exemplary embodiments of the invention.

Reference is now made to FIG. 8, which is a simplified messaging flow diagram according to exemplary embodiments of the invention.

805—The content server (e.g. exchange, website or email server) has ad space available.
810—The content server sends a bid request to the secure link server.
815—The secure link server (acting as a real-time bidder) selects an ad and returns the ad with a secured single tap link to the content server.
820—The content server provides content with the secured link to the user device.
825—The user device displays the content.
830—The secured link is selected by the user.
835—The user device requests authorization for Single Tap mode from the verification server.
840—The verification server checks if the request signature is valid.
845—If the request signature is valid, the verification server authorizes automatic installation.
850—The user device downloads and installs the application according to single tap mode.
855—If the request signature is invalid, the verification server prohibits automatic installation.
860—The user device redirects the user to the app store (or operates in another non-single tap mode such as requiring further verification from the user).

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant applications, link formats, string formats, encodings, encryption/decryption algorithms and digital signature algorithms will be developed and the scope of the term application, link, encoding, encryption, decryption and signing is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A verification server for securing application installation on a user device, comprising processing circuitry configured to:
input, from a user device, a request for automatic installation of said application onto said user device, said request comprising a request signature included in a link selected by a user of said user device;
verify a validity of said request signature using a first key associated with a second key used to generate valid signatures in response to received requests for secured links each comprising respective values of at least one parameter used to create a valid signature, said at least one parameter comprises a device identifier;

when said request signature is valid, respond to said user device that said automatic installation is authorized; and when said request signature is invalid, respond to said user device that said automatic installation is prohibited.

2. The verification server of claim 1, wherein said first key and said second key are identical.

3. The verification server of claim 1, wherein said first key comprises a public key and said second key comprises a private key corresponding to said public key.

4. The verification server of claim 1, wherein said request for automatic installation comprises respective values of said at least one parameter.

5. The verification server of claim 4, wherein said verification server being configured to verify said validity of said request signature by:

forming a first string from said at least one parameter values according to rules used to generate a signature string for a valid secured link;

decrypting said request signature using said first key; and comparing said first string to said decrypted request signature, said request signature being valid when said first string and said decrypted request signature are the same and invalid when said first string and said decrypted request signature are different.

6. The verification server of claim 5, wherein said forming said first string comprises performing a hashing operation on a preliminary string formed from said at least one parameter values, using a same hashing algorithm used to generate valid signatures.

7. The verification server of claim 1, wherein said at least one parameter used to create a valid signature further comprises at least one of:

a signature version identifier;
an application identifier;
a cryptographic nonce; and
an expiration timestamp.

8. The verification server of claim 1, further configured to prohibit said automatic installation when an expiration timestamp for said request has expired.

9. The verification server of claim 1, further configured to prohibit said automatic installation when a request for automatic installation received from said user device is missing a request signature.

10. A method for securing application installation on a user device, comprising: inputting, from said user device, a request for automatic installation of said application onto said user device, said request comprising a request signature included in a link selected by a user of said user device;

verifying a validity of said request signature using a first key associated with a second key used to generate valid signatures in response to received requests for secured links each comprising respective values of at least one parameter used to create a valid signature, said at least one parameter comprises a device identifier;

when said request signature is valid, responding to said user device that said automatic installation is authorized; and when said request signature is invalid, responding to said user device that said automatic installation is prohibited.

11. The method of claim 10, wherein said first key and said second key are identical.

12. The method of claim 10, wherein said first key comprises a public key and said second key comprises a private key corresponding to said public key.

13. The method of claim 10, wherein said request for automatic installation comprises respective values of said at least one parameter.

14. The method of claim 10, wherein said at least one parameter used to create a valid signature further comprises at least one of:

a signature version identifier;
an application identifier;
a cryptographic nonce; and
an expiration timestamp.

15. The method of claim 10, wherein verifying said validity of said request signature comprises:

forming a first string from said at least one parameter values in accordance with rules used to generate a signature string for encryption into a valid signature;

decrypting said request signature using said first key; and comparing said first string to said decrypted request signature, said request signature being valid when said first string and said decrypted request signature are the same and invalid when said first string and said decrypted request signature are different.

16. The method of claim 15, wherein said forming a first string comprises hashing a preliminary string formed from said at least one parameter value, using a same hashing algorithm used to generate valid signatures.

17. The method of claim 10, further comprising prohibiting said automatic installation when an expiration timestamp for said request has expired.

18. The method of claim 10, further comprising prohibiting said automatic installation when a request for automatic installation received from said user device is missing a request signature.

19. A system for securing application installation on a user device, comprising:

a secure link server comprising processing circuitry configured to:

output a secured link for automatically downloading and installing an application onto a user device in response to a received request for said secured link comprising respective values of at least one parameter used to create a valid signature, said at least one parameter comprises a device identifier, said secured link comprising a signature string encrypted with a first key; and a verification server comprising processing circuitry configured to:

input, from said user device, a request for automatic installation of said application onto said user device, said request for automatic installation comprising a request signature included in a link selected by a user of said user device;

verify a validity of said request signature using a second key associated with said first key;

when said request signature is valid, respond to said user device that said automatic installation is authorized; and when said request signature is invalid, respond to said user device that said automatic installation is prohibited.

20. The system of claim 19, further comprising a first secure vault for providing said first key to said secure link server and a second secure vault for providing said second key to said verification server.

21. The system of claim 19, wherein said first key and said second key are identical.

22. The system of claim 19, wherein said first key comprises a private key and said second key comprises a public key corresponding to said private key.

23. The system of claim 19, wherein said secure link server is configured to generate said secured link by:
forming a first string from said at least one parameter value in accordance with specified rules;
encrypting said first string with said first key; and
creating a secured link comprising said encrypted first string and said at least one parameter value.

24. The system of claim 19, wherein said secure link server is configured to generate said secured link by:
forming a first string from said at least one parameter value in accordance with specified rules;
signing said first string with said first key; and
creating a secured link comprising said encrypted first string and said at least one parameter value.

25. The system of claim 19, wherein said secure link server outputs said secured link to one of:
a content server for forwarding said secured link to be rendered in content displayed on said user device; and
said user device.

26. The system of claim 19, wherein said request for automatic installation further comprises respective values of said at least one parameter, and wherein said verification server is configured to verify said validity of said request signature by:
forming, in accordance with rules used by said secure link server to create a valid signature string, a second string from respective values of said at least one parameter extracted from said request for automatic installation;
decrypting said request signature using said second key; and
comparing said second string to said decrypted request signature, said request signature being valid when said second string and said decrypted request signature are the same and invalid when said second string and said decrypted request signature are different.

* * * * *